United States Patent
Abily et al.

[19]

[11] Patent Number: 6,125,407
[45] Date of Patent: Sep. 26, 2000

[54] SYSTEM FOR FLUSHING HIGH-SPEED SERIAL LINK BUFFERS BY IGNORING RECEIVED DATA AND USING SPECIALLY FORMATTED REQUESTS AND RESPONSES TO IDENTIFY POTENTIAL FAILURE

[75] Inventors: Jack Abily, Plaisir; Yu Jun Jean Qian, Cergy St Christophe, both of France

[73] Assignee: Bull S.A., Louveciennes, France

[21] Appl. No.: 09/123,993

[22] Filed: Jul. 29, 1998

[30] Foreign Application Priority Data

Jul. 31, 1997 [FR] France .................................. 97 09817

[51] Int. Cl.[7] .................................................. G06F 13/14
[52] U.S. Cl. ..................... 710/7; 710/7; 710/52; 711/127; 711/135; 714/15; 714/25; 714/43
[58] Field of Search .................. 710/7, 52; 711/127, 711/135; 714/2, 15, 25, 43

[56] References Cited

U.S. PATENT DOCUMENTS

| | | | |
|---|---|---|---|
| 5,838,689 | 11/1998 | Fukui et al. .............................. | 370/465 |
| 5,983,382 | 1/1999 | Pauls ....................................... | 714/744 |
| 5,987,618 | 11/1999 | DeRoo et al. ........................... | 713/400 |
| 6,014,761 | 1/2000 | Lachish et al. ......................... | 714/702 |

*Primary Examiner*—Thomas C. Lee
*Assistant Examiner*—Twanna Gossom
*Attorney, Agent, or Firm*—Miles & Stockbridge P.C.; Edward J. Kondracki

[57] ABSTRACT

A process and system for flushing high-speed buffers in a serial link used between a mover circuit (4) that executes data move operations and at least two memories through at least two channels (400, 401), the data move operations each being constituted by a move request followed by the return of a response or acknowledgement of the request, cyclically with interlacing, the responses following the same pair of serial channels (400, 401) as the requests for which they constitute the acknowledgements. The process comprises:

a step for placing the mover circuit (4) into a so-called "absorption" mode of operation, a step for generating a specific write request and a specific read request, each of which comprises a so-called "barrier" marker contained in a control character preceding or following the request, a step for accumulating the responses received, and a step for comparing the responses received.

20 Claims, 10 Drawing Sheets

SYSTEM FOR FLUSHING HIGH-SPEED SERIAL LINK BUFFERS BY IGNORING RECEIVED DATA AND USING SPECIALLY FORMATTED REQUESTS AND RESPONSES TO IDENTIFY POTENTIAL FAILURE

CROSS REFERENCE TO RELATED APPLICATIONS

The subject matter of this application is related to the following applications, assigned to the assignee of the present invention:

Ser. No. 08/867,404, filed Jun. 2, 1997, still pending entitled "Circuit For Moving Data Between Remote Memories and Computer Comprising Such a Circuit", in the names of Jack Abily and Jean Yujun Qian;

Ser. No. 08/867,410, filed Jun. 2, 1997, now U.S. Pat. No. 6,029,233 entitled "Circuit For Moving Data Between Remote Memories and Computer Comprising Such A Circuit", in the names of Jack Abily, Jean-Francois Autechaud and Christophe Dionet.

Ser. No. 08/953,668, filed Oct. 17, 1997, still pending entitled "Atomic Operation In Remote Storage And Device For Executing This Operation", in the names of Jean-Francois Autechaud and Christophe Dionet;

Ser. No. 08/962,586, filed Nov. 3, 1997, now abandoned entitled "Electrical Circuit For Exchanging Data Between A Microprocessor And A Memory and Computer Comprising A Circuit Of This Type", in the names of Jack Abily and Yujun Jean Qian;

Ser. No. 08/968,424, filed Nov. 12, 1997, still pending entitled "Process For Managing Memories In An Information System And Information System And Memory That Implements The Process", in the names of Jack Abily, Jean-Jacques Pairault and Jean Perraudeau;

Ser. No. 09/020,671, filed Feb. 9, 1998, still pending entitled "Device And Process For Detecting Errors In An Integrated Circuit Comprising A Parallel-Serial Port", in the names of Jean-Francis Autechaud and Christophe Dionet;

Ser. No. 09/102,023, filed Jun. 22, 1998, still pending entitled "Process for Detecting Errors In A Serial Link Of An Integrated Circuit And Device For Implementing The Process", in the names of Jean-Francois Autechaud and Christophe Dionet.

The subject matter of the applications Ser. Nos. 08/867,404; 08/867,410; 08/953,668; 08/962,586; 08/968,424; 09/020,671; and 09/102,203 is hereby incorporated by reference.

BACKGROUND OF THE INVENTION

1. Field of the Invention

The present invention relates to a process for flushing high-speed buffers in a serial link and a device for implementing the process. More specifically, the invention relates to a process and device for flushing the serial link buffers of an integrated circuit or two integrated circuits comprising a parallel-serial and serial-parallel port.

2. Description of Related Art

The invention is particularly applicable when it is desirable to use gigabit-speed serial links having an error rate that is non-null, for example on the order of $10^{-15}$ to $10^{-17}$, to produce an internal link to a logic unit which would normally be produced by a parallel link that is not prone to interference. This substitution is motivated by the fact that high-speed serial links have many advantages. For example, high-speed serial links provide high density and ease of connection with identical passbands, and allow a long link, for example up to ten meters, which is impossible with standard internal logical links.

SUMMARY OF THE INVENTION

In the case where the serial link is a 1-gigabaud serial link, and assuming that two ports of the same type are communicating with one another through the serial link, allowing machines whose error rate in terms of message corruption and calibration loss and/or protocol inconsistency is on the order of $10^{-17}$ to communicate with one another, it is noted, based on the speed of the serial link and the error rate of the machine, that this seemingly low error rate can generate a substantial error and an abnormal operation of the machine every two days.

The invention is applicable, for example, when the activity of a serial link has stopped due to the detection of an error, and requires a restart procedure which renders the interference invisible to the user. The detection of errors in the serial link is disclosed in Ser. No. 09/102,203, filed Jun. 22, 1998, entitled "Process for Detecting Errors In A Serial Link Of An Integrated Circuit And Device For Implementing The Process", in the names of Jean-Francois Autechaud and Christophe Dionet, and corresponding to French patent application number 97 07997 filed by the Applicant on Jun. 26, 1997.

Integrated circuits comprising interfaces between a parallel bus and a serial bus are known, but in general they do not comprise a device and process for recovering from errors, since they are based on the principle that the communication does not include any errors involving the serial link, or if it does include any, that the detections of errors and recoveries from errors are handled in a higher layer (calibration loss) at the software level.

A first object of the invention is to propose a process for flushing high-speed serial link buffers, making it possible to start or restart the lines of the link that have stopped, for example due to interference.

This object is achieved due to the fact that in order to flush high-speed serial link buffers used between a mover circuit executing data move operations, namely read and write operations, and at least two memories, the mover being linked to each memory by at least two channels, the data move operations each being constituted by a move request followed by the return of a response or acknowledgement of the request, the mover using at least two two-way channels that link it to a memory cyclically with interleaving, for the same operation, each channel section maintaining the order in which the requests, and respectively the responses, in the same request stream and respectively the same response stream are sent, the responses using the same pair of serial channels as the requests for which they constitute the acknowledgements, the process comprises:

a step for placing the mover into a so-called "absorption" mode of operation, in which the responses are accepted independent of any order of arrival through the channels and are ignored by the mover;

a step for generating a specific write request and a specific read request in all or some of the channels of the serial link, the specific requests having no effect on the memories and each comprising a so-called "barrier" marker contained in a control character preceding and/or following the request, the barrier marker also being contained in a control character associated with the response corresponding to each specific request;

a step for accumulating the received responses comprising a barrier marker;

a step for comparing the received responses comprising a barrier marker with the specific requests generated, making it possible either to locate a potential failure in the case where the expected responses for a barrier marker are missing, or to recognize that a flushing of all the channels has been carried out in the case where all of the expected responses with barrier markers have been received.

According to another characteristic, the step for comparing the received responses comprising a barrier marker with the specific requests generated comprises a step for comparing the number of received responses with a barrier marker with the number of specific requests generated.

According to another characteristic, the control character or characters associated with the requests, or respectively with the responses, include information on the transmission source and the paths followed by the requests, or respectively by the responses, the step for comparing the received responses comprising a barrier marker with the specific requests generated comprising a step for reading the information contained in the control characters of the responses with a barrier marker that relates to the transmission source and the paths followed, making it possible to locate potential failures of the serial link.

According to another characteristic, the step for placing the mover into the "absorption" mode is carried out while the serial link is offline, the serial link being restarted after the placement of the mover into the "absorption" mode.

According to another characteristic, the specific write requests are constituted by partial write requests with a null mask so as not to modify the status of the machine during the flushing.

According to another characteristic, the mover executes data transfers in packets of 4K bytes maximum, and stores in registers the information on the current data block transferred and the next data block to be transferred, making it possible to restart the data transfer at the point where the failure occurred.

According to another characteristic, when the step for comparing the received responses comprising a barrier marker with the specific requests generated ends with the recognition that the flushing of all the channels has been carried out, the mover is returned to the normal mode of operation, in which it uses the channels that link it to a memory cyclically, with interleaving.

According to another characteristic, the process for flushing high-speed serial link buffers is used following a failure of the link such as an electrical disturbance, after the restart or reinitialization of the serial link and before the restart of the current application at the last restart point, without reinitializing the entire system.

According to another characteristic, the process for flushing high-speed serial link buffers is used for self-testing by scanning the subsystem of the network interconnecting the memories with the mover, the location of potential failures making it possible to reconfigure the link in a degraded mode, ignoring the malfunctioning channel or channels.

According to another characteristic, each two-way channel of the serial link constituted by two one-way cables in which the data travel in opposite directions.

Another object of the invention is to propose a device that allows the process to be implemented.

This object is achieved due to the fact that the device for implementing the process for flushing high-speed serial link buffers is applied to high-speed serial links being used by a mover circuit executing data move operations, namely read and write operations, between at least two memories, the mover being linked to each memory by at least two two-way channels, the data move operations each being constituted by a move request followed by the return of a response or acknowledgement of the request, the mover using the channels that link it to a memory cyclically with interleaving, for the same operation, each channel section maintaining the order in which the requests, and respectively the responses, of the same request stream and respectively the same response stream are sent, the responses following the same channel as the requests for which they constitute the acknowledgements, the device comprising:

means for placing the mover into a so-called "absorption" mode of operation, in which the responses are accepted independent of any order of arrival through the various channels and are ignored by the mover, means for generating a specific write request and a specific read request in each of the channels of the serial link, the specific requests having no effect on the memories, means for generating within these requests a so-called "barrier" marker contained in a control character preceding and/or following the request, and means for generating a barrier marker in a control character associated with the response corresponding to each specific request, means for accumulating the received responses comprising a barrier marker, and means for comparing the received responses comprising a barrier marker with the specific requests generated, making it possible either to locate a potential failure in the case where the expected responses comprising a barrier marker are missing, or to recognize that a flushing of all the channels has been carried out in the case where all of the expected responses comprising a barrier marker have been received.

According to another characteristic, the device for flushing high-speed serial link buffers comprises means for comparing the number of received responses with a barrier marker with the number of specific requests generated.

According to another characteristic, the device for flushing high-speed serial link buffers comprises means for generating information related to the transmission source and the paths followed by the requests, and respectively by the responses, in the control character or characters associated with the requests, and respectively with the responses, the flushing device comprising means for reading the information contained in these control characters of the responses with a barrier marker related to the transmission source and the paths followed, making it possible to locate potential failures of the serial link.

According to another characteristic, the device for flushing high-speed serial link buffers comprises data processing means which ensure the reinitialization of the serial link followed by the placement of the mover into the so-called "absorption" mode of operation.

According to another characteristic, the data processing means ensure the generation of specific write and read requests, the responses with a barrier marker to the specific requests being received by these same data processing means.

According to another characteristic, the data processing means comprise at least one accumulator register wherein each bit represents the generation of a specific request, each response with a barrier marker received by the processing means causing the writing of a so-called "barrier" bit in the accumulator register in order to allow the comparison of the number of received responses with a barrier marker with the number of specific requests generated.

According to another characteristic, the data processing means comprise timeout means, making it possible to generate a failure detection message in the case where an expected response with a barrier marker is missing after a predetermined time lapse.

BRIEF DESCRIPTION OF THE DRAWINGS

Other characteristics and advantages of the present invention will become more clearly apparent with a reading of the following description given in reference to the appended drawings, in which.

DESCRIPTION OF THE PREFERRED EMBODIMENTS

Figure 3A:
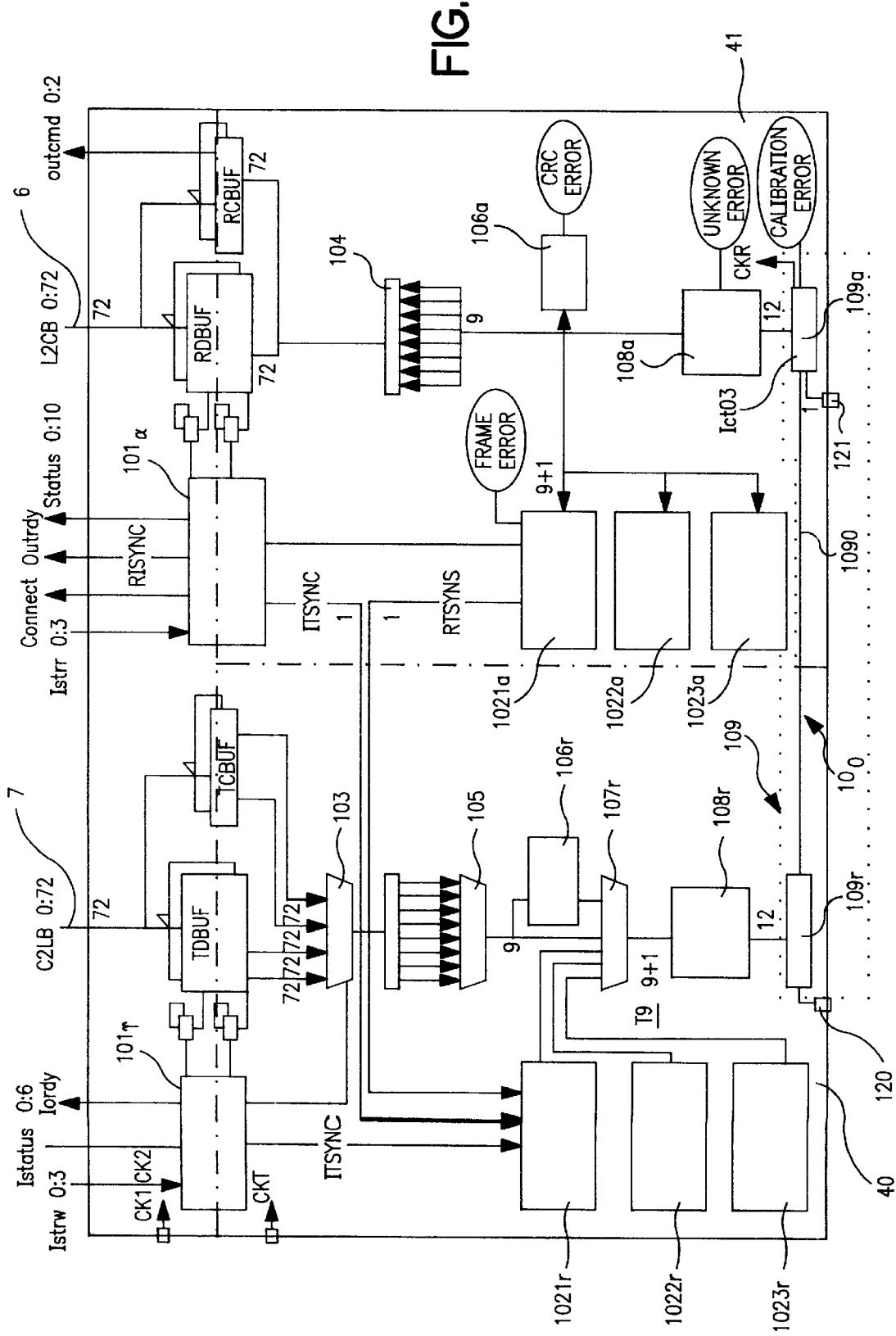
FIG. 3A represents part of an integrated circuit constituting a serial-parallel interface port according to the invention.

The invention whose process is explained below requires ports like the one in FIG. 3A for its implementation.

Figure 3B:
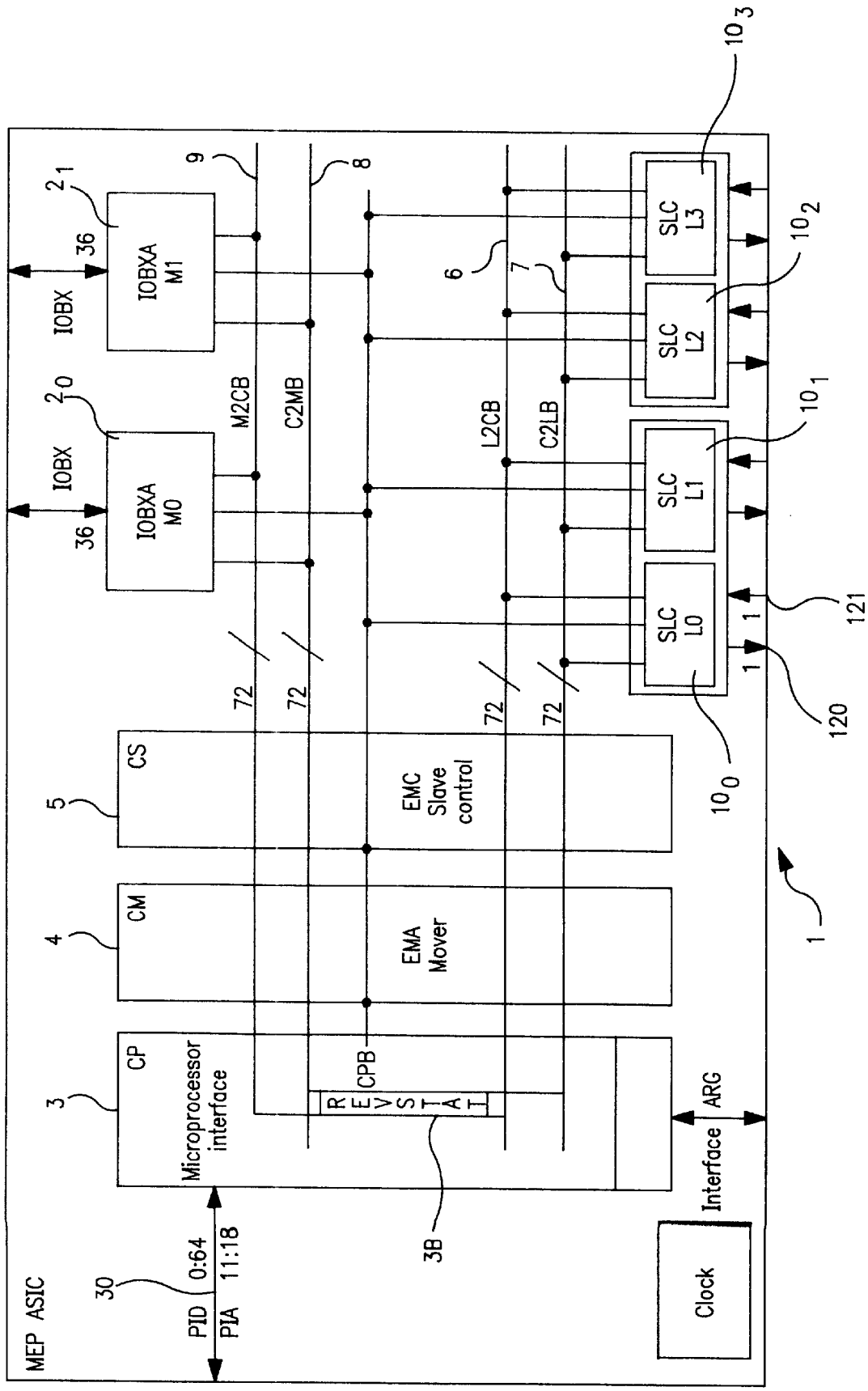
FIG. 3B represents the block diagram of an integrated circuit incorporating an interface port of this type.
Figure 4:
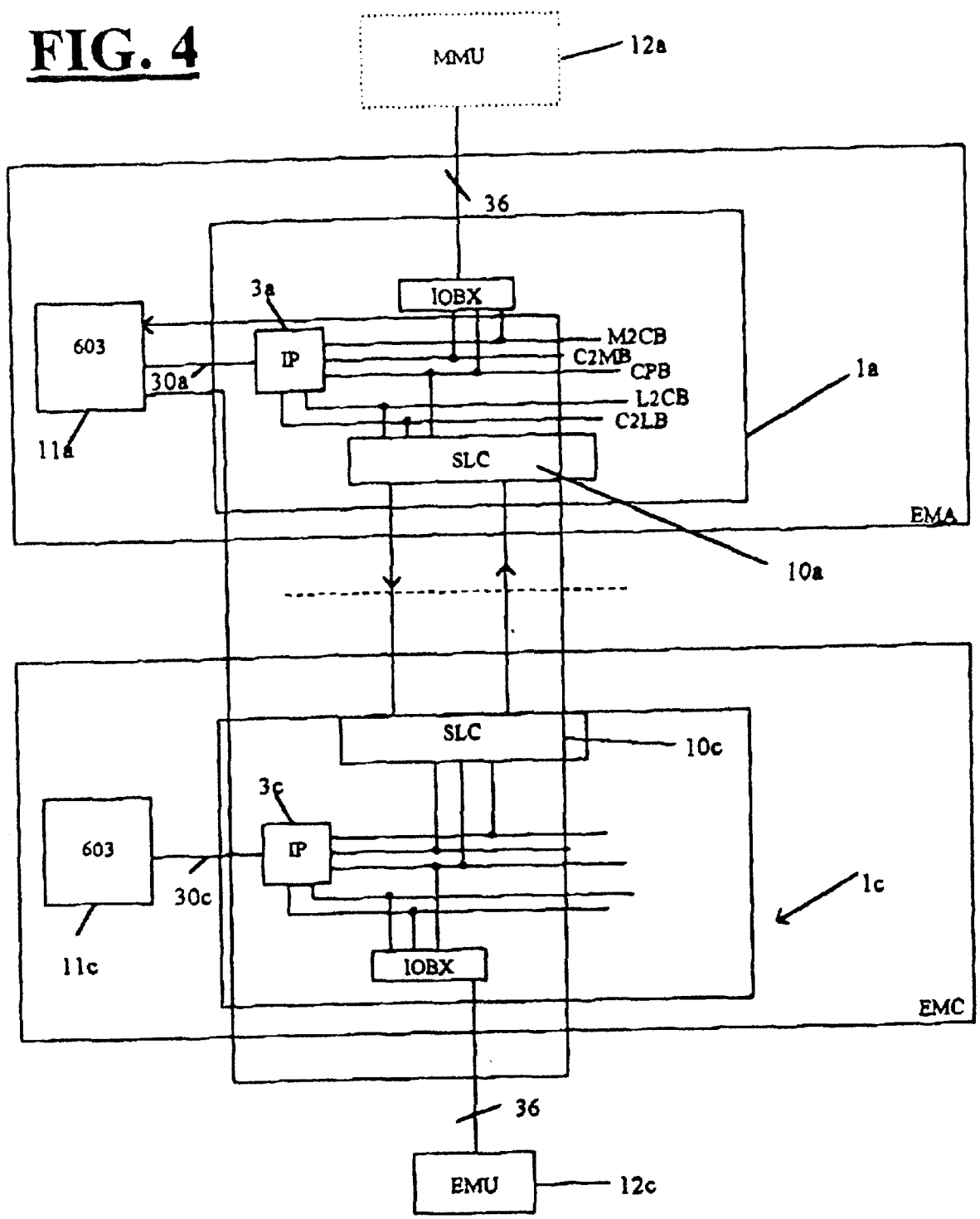
FIG. 4 represents the architectural diagram of a machine using the integrated circuit of FIG. 3B.

The port $10_0$, known as the control block of the serial link SLC (Serial Link Control), is incorporated into an integrated circuit, for example of the type represented in FIG. 3B. This integrated circuit (1) comprises a plurality of ports $10_0$, $10_1$, $10_2$, $10_3$ of the same type as the one in FIG. 3A, which communicate at a system frequency of, for example, 33 MHz with two parallel 72-bit data busses, L2CB for input (6) and C2LB for output (7). These parallel busses communicate with logic circuits (3, 4, 5), performing for the circuit (3) a functionality for interfacing with a microprocessor through a 64-bit bus (30), for the circuit (4) a move functionality (MOVER) for the integrated circuit when the latter is incorporated into a data-type card, and for the circuit (5) a memory control functionality (Slave Control). These circuits (3, 4, 5) also communicate through two 72-bit data busses M2CB (9), C2MB (8), with two input-output interfaces IOBX $2^0$, $2^1$ which allow communication with 36-bit busses issuing either from a main memory MMU (12a, FIG. 4) or an expanded memory EMU (12c) as represented in FIG. 4. A control bus CPB allows the microprocessor communicating with the integrated circuit (1) to access the control and status registers of the various circuits (3, 4, 5, 2, 10) present in the integrated circuit. This integrated circuit (1) is used in a machine comprising a main memory (12a), and an expanded memory (12c) which can be shared by a plurality of systems. A first master integrated circuit (1a) according to the invention communicates through the bus (30a) with a first processor (11a) and through the interface IOBX with the memory (12a), while a second slave integrated circuit (1c) communicates, on the one hand, with the first master circuit (1a), and on the other hand through the bus (30c) with a second processor (11c) and with an expanded memory (12c). The port (10a) for parallel-serial transmission and serial-parallel reception in the circuit (1a) comprises for the sending part (40, FIG. 3A) a pair of 8×72-bit data buffers TDBUF connected to the transmitting bus C2LB. A multiplexer (103) makes it possible to select either of two buffers TDBUF or either of two buffers TCBUF of control signals which contain the header. A buffer TCBUF and a buffer TDBUF can be unified to form a buffer TBUF. The information leaving the multiplexer (103) is sent through a disassembly circuit (105), which generates a sequence of 9-bit characters constituting the characters to be transmitted. This disassembly circuit (105) is also connected to a circuit for generating a cyclic redundancy check character CRC ($106_T$). A second multiplexer (107) makes it possible to select the signals transmitted to an encoder ($108_T$) which allows the 9/12 encoding of the transmitted information by associating a check bit with the normal character formed by a nine-bit byte, and filling it out to 12 bits with a start bit and a stop bit. The multiplexer (107) receives signals issuing from a transmitting status unit ($1021_T$) of the serial link comprising at least one 2-bit token counter, wherein each bit representing a token indicates the availability of the associated buffer. The multiplexer (107) receives signals issuing from a substitution status unit ($1022_T$), and signals issuing from a port initialization status unit ($1023_T$) The output of the encoder ($108_T$) is linked to a serializer circuit ($109_T$) whose output constitutes a serial link (120) which sends signals at a speed of, for example, 1 gigabit/sec. The serializer is also connected by a serial loop link (1090) to a deserializer ($109_R$) of the receiving circuit, or receiving part (41) of the port ($10^0$). This serial loop link (1090) is validated in the deserializer ($109_R$) by a signal (Ict03). Each transmitting buffer is controlled by a transmitting buffer management status unit ($101_T$) which receives Istatus 0:6, Istrw 0:3, and sends the signal Inrdy. In the receiving part (41), the deserializer ($109_R$) is connected to a decoder ($108_R$) which operates on the same principle as the encoder ($108_T$) of the transmitting circuit. This decoder of the receiving circuit sends the 9 bits of each datum to a data assembly circuit (104) for transforming the data received serially into a 1×72, 3×72, 8×72, 9×72-bit message, which is loaded into a pair of receiving data buffers (RDBUF). This pair of receiving data buffers (RDBUF) is controlled by a receiving buffer management unit ($101_R$) and is associated with a pair of receiving control buffers (RCBUF) which contain the headers of the messages. The output from the decoder ($108_R$) of the receiving circuit is branched to a message verification code circuit ($106_T$), which generates a cyclic redundancy check character CRC for comparison. The $CRC_{N+1}$ is updated after each reception of 9 data bits, by calculating the CRC into 16 bits using a cyclic permutation algorithm from the data received $D_i$ and from the values $R_i$ of the bits of the previous $CRC_N$. Of course, the CRC could be calculated into 18 bits instead of 16 bits. The information transmitted by this decoder (108$_R$) is also transmitted to a status unit constituting a history buffer (1022$_R$), to a status unit of the receiving port (1021$_R$), and to a port initialization status unit (1023$_R$). The receiving buffer management status unit (101$_R$) sends three signals (Connect, Outrdy, Status 0:10) and receives as input through three lines the information (Istrr 0:3). The signal (Outrdy) indicates that the output is ready; this signal indicates that there is a complete message waiting to be read. The signal Status indicates the status of the outputs: whether or not they are interrupts, whether or not they are indivisible operations, memory access or register access, local or remote, ISCON or non-ISCON, microprocessor/mover (MOVER)/slave (SLAVE) source, whether or not they are delayed responses, whether or not this is the last message, whether or not there is a data error, whether or not there is external memory access, and whether or not this is an insignificant message. The output Connect indicates that the port SLC (10°) is disconnected when this output is deactivated. The inputs Istrr allow the reading of the receiving ports in FIFO order, and the command which reads the last double word of a message causes the generation of a flow control character (token) associated with the buffer, which thus becomes free. This flow control character is transmitted from the receiving buffer management status unit (101$_R$) to the transmission management status unit (1021$_T$), and through the latter to the multiplexer (107) in order to transmit this information to the input port (10c) of the card (1c), associated in the serial link with the receiving port (109$_R$) whose receiving buffers (RDBUF) have just been read. The transmitting buffer management status unit (101$_T$) comprises two inputs Istatus and Istrw, and one output Inrdy. This output Inrdy indicates that there is a free transmitting buffer (TDBUF) waiting to be written. The lines Istatus make it possible to specify the types of messages to be written, and to determine, as a function of the value of the first two status bits, the following indications: 00 not in use, 01 data only, 10 header, 11 header and data. The third bit Istatus indicates whether or not this is the last message. The fourth bit indicates whether or not there is a data error; and the fifth bit indicates whether or not there is external access to the memory. Lastly, the signal Istrw makes it possible to write the transmitting buffers (TDBUF) in FIFO order. The signal Istrw, which writes the last double word of a message, initializes the transmission of the message as soon as a remote receiving buffer (RDBUF) (for example of the port 10c) is declared to be free by a receiving port connected to the serial link (120), and when any current transmission from another sending buffer of the same parallelserial port has terminated.

The mover part (4) of the integrated circuit comprises on each side a header calculating circuit (40a, 40b). A first header calculating circuit (40a) is connected to the transmitting bus C2LB of the serializer circuit SLC and to the transmitting bus C2MB of the port IOBX. A second header calculating circuit (40b) is connected to the transmitting bus C2LB of the serializer circuits SLC and to the transmitting bus C2MB of the ports IOBX. This receiving header calculating circuit (40a) receives information originating from the registers RLP, RPA, RIPA, RAC, the registers RLP receiving information from the register RNLP. The register RPA receives information from the register RNPA, these two registers RPA and RNPA being 28-bit registers. The 7-bit RAC register receives information from the 7-bit register RNAC. The registers RAC, RNAC, RIPA, RPA, RLP can be accessed by the given part of the bus CPB; so can the register RNLP, RNPA.

A FIFO register stack (41) is connected to the receiving bus L2CB, M2CB, and to the transmitting bus C2LB, C2MB. This register stack (41) of 64 9-bit bytes is read-addressed by a register DSRP and write-addressed by a register DSWP. The transmitting header calculating circuit (40b) receives the information from the registers WPA, WIPA, OVFB, WMSKB, OVFE, WMSKE, all of these circuits being controlled by an interrupt management circuit (42), an event management circuit (43) and a control circuit (44). The register RIPA contains the internal address of a page formed of 6 bits, and the register RPA contains the address of a page formed of 28 bits, thus making it possible to access a current page of 4 KB. The 7-bit register RAC makes it possible to count the 64 bytes accessed in the page. The register RLP constitutes a marker indicating whether the page is the last one to be accessed.

The 28-bit register RNPA indicates the address of the next page, the 7-bit register RNAC contains the count of 64 bytes accessed in the next page, and the register RNLP is a marker indicating whether the next page is the last one to be accessed. A register RNV constitutes a marker indicating whether these three preceding registers have valid contents. All these elements are the resources which allow the generation of an address for the source memory in a move.

Likewise, the resources for generating an address for the destination memory can be divided into three parts. A first resource constitutes the resources for managing the write accesses in the first and last 64-byte block of the move. These first resources are constituted by a first mask indicating the first 8 bytes of the sub-block of the first block of the move to be written and contained in the 3-bit register WMSKB. A second mask indicates the last 8-byte sub-block in the last block of the move to be written, this mask being contained in a 3-bit register WMSKE. A register OVFE contains the indication of a write access in the first block of a move. A register OVFE contains an indication of a write access in the last block of a move. A second resource for accessing a current page of 4 KB is constituted by a first 28-bit address register WPA containing the address of the page and a 6-bit register WIPA containing the address within the page. The third resource provides information on the next page to be accessed and is constituted by an address register WNPA containing the address of the next page in 28 bits, and a register WNV which constitutes a marker indicating whether these preceding registers have valid contents.

The 64-bit FIFO stack (41) is a data buffer dedicated to the move, for managing the non-alignment of the starting addresses of the MMU and the EMU. This buffer (41) is a FIFO buffer with a 3-bit read pointer DSRP and a 3-bit write pointer DSWP. The control circuit (44) authorizes the processor (11) to stop a move and to configure the mover in a special way in order to process a fatal serial link error. The event register (43) stores the source of an interrupt directed to the processor interface circuit (3). The processor (11) connected to the circuit (1) supplies the information for the read accesses to the first page of the source memory by providing the transfer direction via a bit E2M set at 1 for a transfer from the EMU to the MMU, and at 0 for a transfer from the MMU to the EMU. This processor also sets the address registers RPA, RIPA, the access register RAC and the register RLP. This initialization inhibits the transmission of write accesses in a destination memory.

The processor supplies the information for the write accesses to the first page of the destination memory by setting: the starting address in the registers WPA, WIPA, the write mask for the first and last 64 bytes in the registers WMSKB and WMSKE, the write pointer of the FIFO, the read pointer of the FIFO and the registers OVFB, OVFE. This initialization validates the transmission of a write access in the destination memory. Likewise, the processor (11) supplies the information for the next page by setting the registers RNPA, RNLP and RNAC for the source memory, and the register WNPA for the destination memory. When the register RAC is not equal to 0, the circuit allows the generation of read access to the source memory. When the source memory is the memory EMU of FIG. 4, the read accesses of the EMU are interleaved through two serial links in 64-byte blocks, transmitted through the serial link $10_0$ for the blocks having an even-numbered address, and transmitted through the serial link $10_1$ for the blocks having an odd-numbered address.

Each time a read request is transmitted, the access counting register RAC is decremented by 1, 2 or 4 and the address register RIPA is incremented by 1, 2 or 4, depending on the type of the request. The data responses are transmitted through two serial links in 64-byte blocks in accordance with the same interleaving rule. Likewise, the read accesses to the MMU are interleaved through the two interfaces IOBX, the first interface ($2_0$) for the 64-byte blocks having an even-numbered address and the second interface ($2_1$) for the blocks having an odd-numbered address. The registers RAC and RIPA are respectively decremented and incremented by 1 with each access. The mover circuit stores the identifier of the transmitting circuit SLC or IOBX from which the first 64-byte block originates.

The operation of the writing part is identical in its utilization of the registers WPA, WIPA, and the exchanges also take place in the interleaved mode. The mover (4) addresses the read requests to the source memory and uses the write pointer DSWP to write the data of the response into the FIFO stack (41). Each time an 8-bit sub-block is written, the register DSWP is incremented by 1. When the mover addresses write requests to the destination memory, it uses the read pointer DSRP to read the data in the FIFO stack. Each time an 8-byte sub-block is read, the register DSRP is incremented by 1, and just like each time a write request is sent, the circuit increments the register WIPA by 1.

Figure 1:
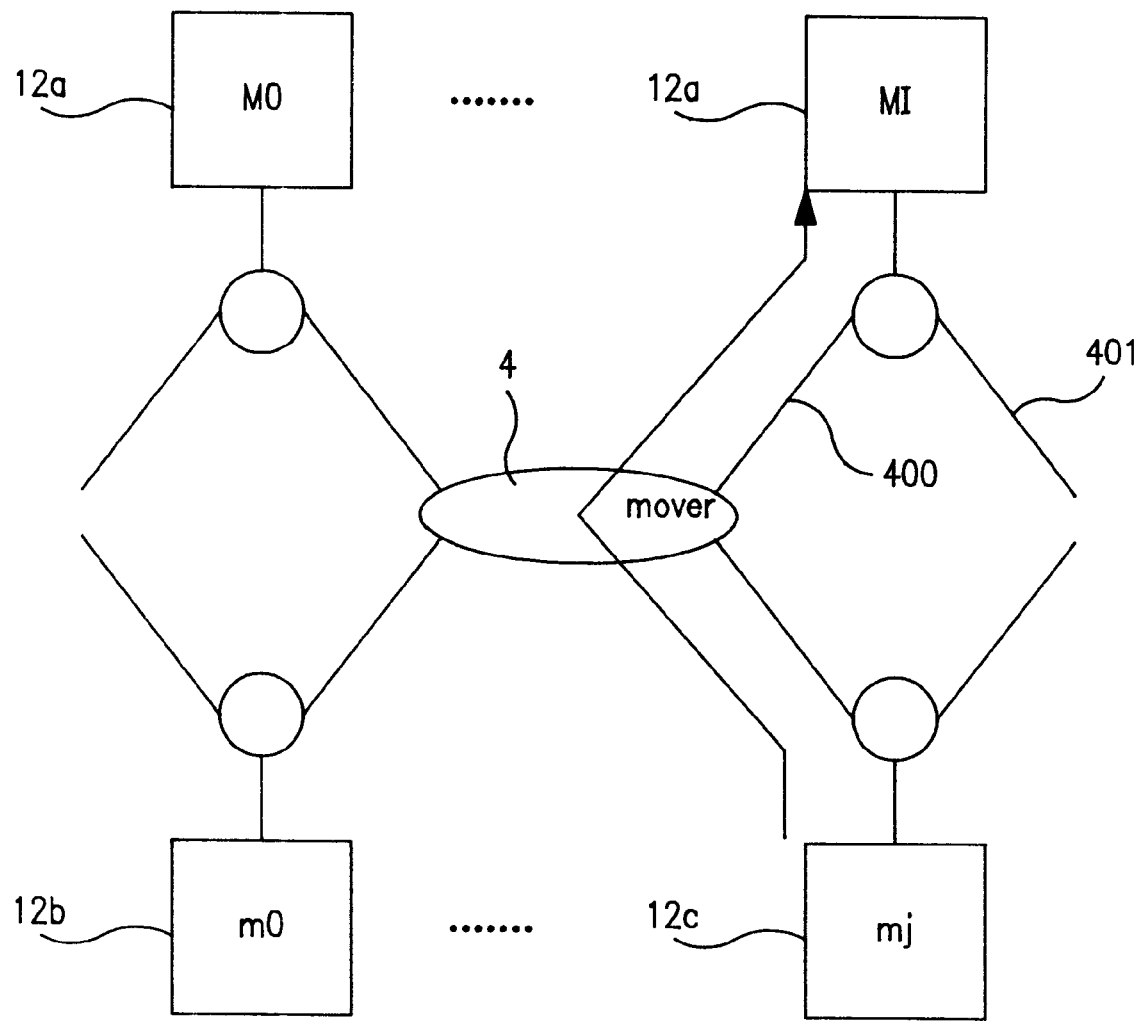
FIG. 1 represents, in a schematic, simplified way, the serial link system linking two memories via a data transfer device in which a flushing process according to the invention is implemented, FIG. 2 schematically represents a detailed part of a path or line of the serial link of FIG. 1.
Figure 2:
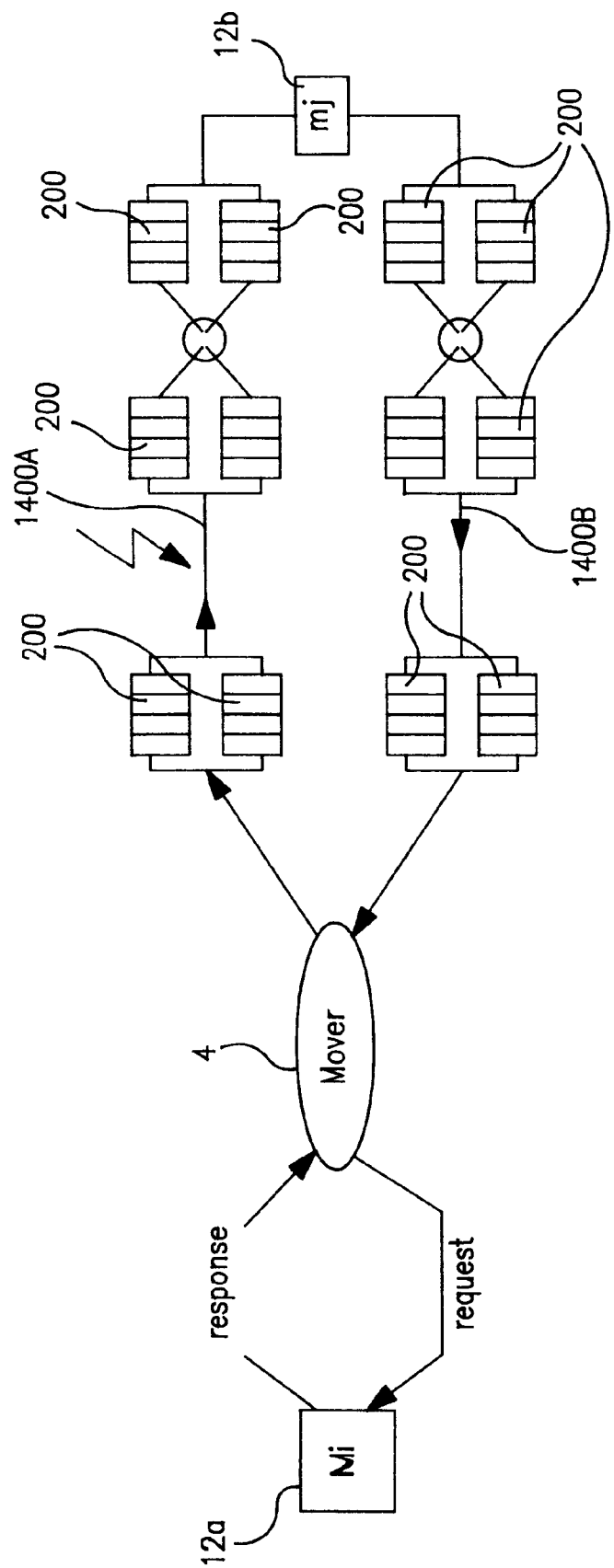

The integrated circuit in FIG. 3B, incorporated for example into an electronic circuit board comprising memories (Mo . . . Mi, mo . . . mj), implements, by means of a mover circuit (4), a functionality for moving data between the memories ([Mo, . . . , Mi], FIG. 1), and the memories ([mo, . . . , mj] FIG. 1). The memories (Mo, . . . , Mi) and mo, . . . , mj) respectively belong, for example, to two different memories (12a, 12c) such as, for example, the memories MMU and EMU of the circuit of FIG. 4. The mover (4) can use a plurality of high-speed serial links ($10_0$, $10_1$, $10_2$, $10_3$), for example two two-way high-speed serial links ($10_0$, $10_1$), to execute the data moves between the two memories (12a, 12c). For example, the mover (4) executes data transfers between a main memory MMU (12a) and an expanded memory EMU (12c). Each serial link ($10_0$, $10_1$) constitutes, for example, a channel (400, 401) or path, respectively even and odd. Each path (400, 401) or channel uses two one-way transmission cables (1400A, 1400B, FIG. 2) which transmit the data in opposite directions. The two one-way transmission cables (1400A, 1400B), respectively, implement the transmission of the requests and the responses of the same line or path (400, 401). Each path (400) comprises different buffers (200, FIG. 2) constituting temporary storage units for passing through cards or busses, for example. The operations passing through the channels (400, 401) of the serial links are essentially constituted by operations for reading and writing a storage area (12a, 12c).

Each (read or write) operation is constituted by a request followed by the return of a response or an acknowledgement of the request. This means that for an operation for reading a storage area, a read request is generated, then in return, a response indicating the acknowledgement of the read request is returned to the source that sent the request. Likewise, the write operations are each constituted by a write request followed by the return of a response or acknowledgement of the write request. The responses follow the same channel (400, 401) as the requests for which they constitute the acknowledgements. Moreover, for a given source and a given type of operation, the order of the responses conforms exactly to the order of the requests for which they constitute the acknowledgements. This means that for each channel (400, 401), the order of a stream of responses to a read order is identical to the order of the stream of read requests for which they constitute the acknowledgement. The same is true for write operations. Thus, no "overflow" is possible in the paths (400, 401). However, compliance with the order between read operations and write operations is not necessarily guaranteed. The requests are processed as a function of the cards available, which does not necessarily mean in the order of their arrival, but the corresponding responses are returned to their source in the order of the requests. In its so-called "normal" mode of operation, the mover (4) uses the channels (400, 401) or paths cyclically, with interleaving. The data are interleaved through the various channels (400, 401) of the serial link. As mentioned above, the serial link can comprise, for example, two channels, respectively designated the even channel (400) and the odd channel (401). The choice of the even (400) or odd channel for the responses or requests depends solely on their address. For example, for a 256-byte read operation, the source can transmit its request through the even channel (400) and can receive the first 64 bytes read through this same even channel (400), the second 64 bytes through the odd channel (401), the third 64 bytes through the even channel (400), and finally the last 64 bytes through the odd channel (401). Each of the messages passing through the channels (400, 401), namely the requests and the responses, is preceded by a control character indicating the type and the length of the message. A second control character follows the end of the message and contains information on the status of the message, for example whether this message is the last message of a sequence and/or whether the memory has delivered an error message.

Figure 5:
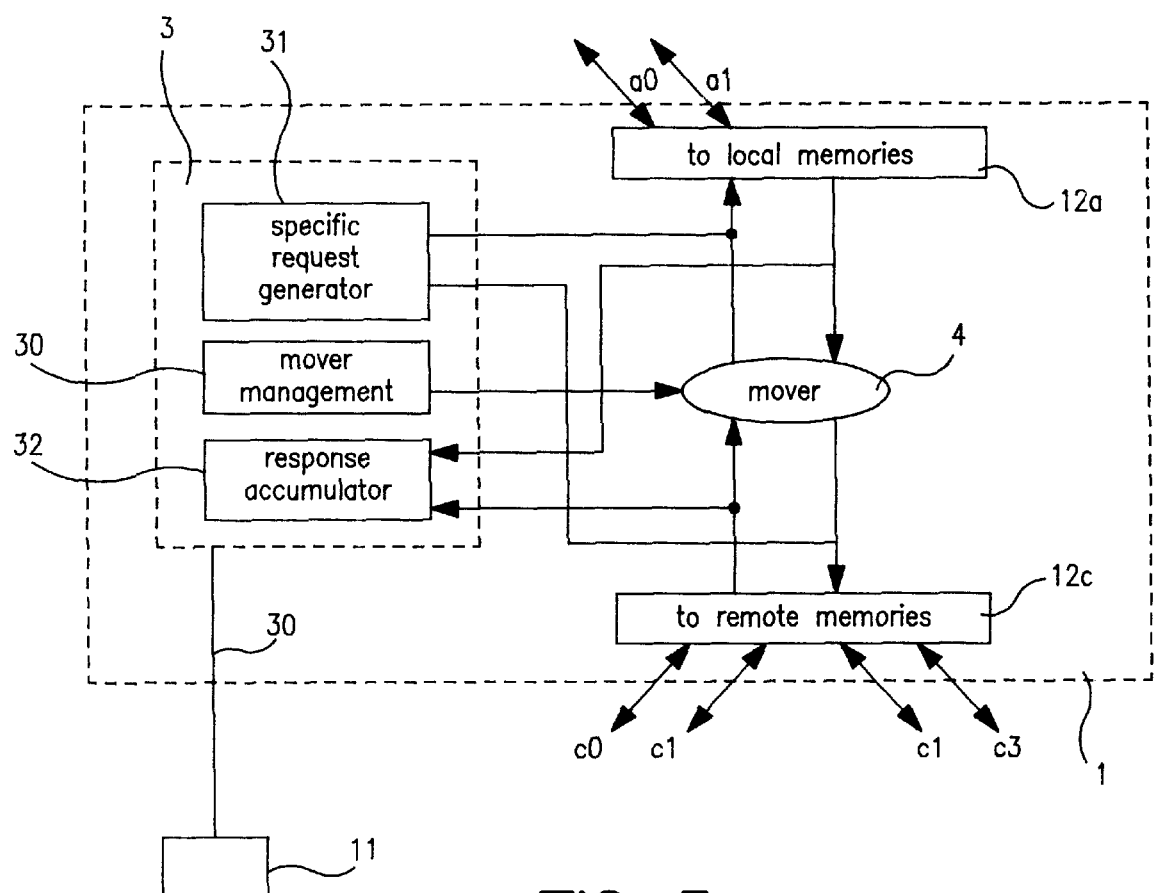
FIG. 5 represents, in a schematic, simplified way, the functionalities implemented by the architecture of FIG. 3B, which constitutes the device for flushing serial link buffers according to the invention.
Figure 6:
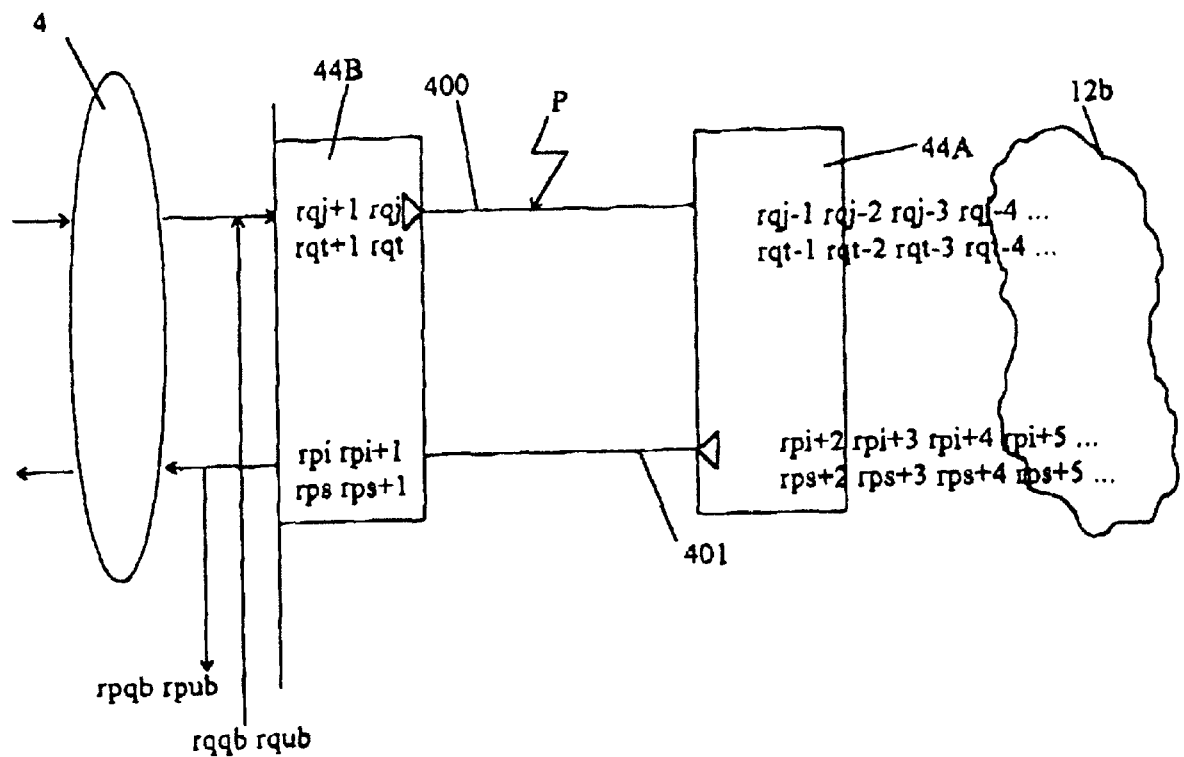
FIG. 6 represents, in a schematic, simplified way, a part of a line of the serial link that links the data transfer device to a memory.

FIG. 6 schematically shows, in a section of a two-way serial link with two channels (400, 401) linking the mover (4) to a memory (12b), a stream of read requests (rqj+1, rqj, rqj−1, rqj−2, rqj−3, rqj−4, . . . ) in the first channel (400), and read responses ( . . . , rpi+5, rpi+4, rpi+3, rpi+2, rpi+1, rpi) in the second channel (401), which are interleaved with a stream of write requests (rqt+1, rqt, rqt−1, rqt−2, rqt−3, rqt−4, . . . ) in the first channel (400), and write responses ( . . . , rps+5, rps+4, rps+3, rps+2, rps+1, rps) in the second channel (401). A disturbance (P) occurring in the line (400) of the first channel will disable the link. In effect, the detection of an error on one side (44A) of the link will generate an error on the other side (44B) of the link. The disturbance (P) isolates the line. The detection of an error causes an automatic reinitialization of the link, for example by means of a hardwired logic as described, for example, in the Applicant's prior applications entitled "Process for detecting errors in a serial link of an integrated circuit and device for implementing the process," filed in France under the number 97 07997, "Device and process for detecting errors in an integrated circuit comprising a parallel-serial port," filed in France under the number 97 01944, and "Process for initializing a serial link between two integrated circuits comprising a parallel-serial port and device for implementing the process," filed in France under the number 97 02974. The detection of an error by the serial link controller can generate an interrupt in the microprocessor (11, FIG. 5) that manages the integrated circuit (1). The microprocessor (11) then triggers the reinitialization of the serial link. Thus, after the detection of an error in the link, the two serial link controllers (SLC), respectively located at the two ends of the link, are disconnected from the outside and reinitialized by means of the microprocessor (11). The read messages (rqj+1, rqj, rqj−1, rqj−2; rpi+3, rpi+2, rpi+1, rpi) and the write messages (rqt+1, rqt, rqt−1, rqt−2; rps+3, rps+2, rps+1, rps) that were passing through the line (400) are lost when the link is reinitialized. The messages that were transmitted to the memory (12b) before the disturbance are held in the buffers (200) of the link while waiting for the two-way line (400) to be restarted. For example, the waiting messages are held in the buffers or FIFO registers. This means that, for example, the read requests (rqj−3 and rqj−4, . . . ) and responses ( . . . , rpi+5, rpi+4) as well as the write requests ( . . . , rqt−3, rqt−4) and responses ( . . . , rps+5, rps+4) that were completely transmitted to the memory (12b) are held while waiting for the line (400) to restart. From the point of view from outside the serial link, that is, for the rest of the machine, the disturbance does not generate any erroneous messages; in effect, only complete and valid messages are sent to the outside. The link, which is interleaved with the defective line (400) is also disabled. In effect, the mover (4) waits for the responses cyclically through the interleaved lines (400, 401). Because of this, the mover (4) will quickly disable the line (401) while it waits for a response from the defective line (400). If the disturbed link is restarted after its reinitialization, all the messages (rqj−3, rqj−4; rpi+5, rpi+4; rqt−3, rqt−4; rps+5, rps+4) held in the buffers will again begin to flow through the link. Thus, in order to prevent the responses of operations that have been aborted due to the disturbance from passing through the link (401), all of the messages held in the buffers must be flushed.

The process for flushing the serial link according to the invention comprises a first step (70) in which the mover (4) is placed into a so-called "absorption" mode of operation. In this mode, the mover (4) accepts the responses to the requests, no matter what the order of their arrival through the various channels (400, 401). This means that in the "absorption" mode, the mover (4) no longer waits for the responses cyclically. Moreover, in the "absorption" mode, the responses received are ignored by the mover (4). As symbolized in FIG. 5, the placement of the mover into the "absorption" mode can be carried out by the microprocessor (11) that manages the integrated circuit (1) through the circuit (3, FIGS. 3B and 5) which interfaces this integrated circuit (1) with the 64-bit bus (30). Thus, the mover (4) of the integrated circuit (1) can be placed into its "absorption" mode by the microprocessor (11) that manages this integrated circuit (1) by means of a mover management logic (30) located in the interface circuit (3). When the mover (4) is in its "absorption" mode, the serial link is restarted and the process continues with a step (71, FIG. 7A) during which a specific write request and a specific read request are generated in each of the channels (400, 401) of the serial link. Each of the specific requests comprises a so-called "barrier" marker or flag contained in the control character located at the end of the message sent through the channel. The barrier marker also appears in the control character located at the start of the message, or header. This means that for each channel (400, 401) of the link, a specific request with a barrier marker is generated for each type of operation. It is noted that the order of the requests and responses for the same operation is strictly maintained in each channel (400, 401) or path of the link. The responses of the specific requests also comprise the corresponding barrier markers in their starting control character or header. Moreover, the specific requests have no effect on the memories, since they do not modify the status of the machine. Thus, the specific write requests can be, for example, partial write requests with null masks, which do not carry out any write operation. The specific read requests, which by definition do not modify the status of the memory, can be, for example, memory block read operations. The generation of the specific requests is carried out by a request generation logic (31) located in the interface circuit (3) and controlled by the microprocessor (11) that manages the integrated circuit (1). The interface circuit (3) comprises a request sequencer controlled by the microprocessor (11) so as to ensure this generation of the specific requests while placing the barrier marker in the header control character of each request. The flushing process then continues with a step (72, FIG. 7A) for accumulating the received responses comprising a barrier marker. Thus, the responses that return to the corresponding source of the requests with a barrier marker are collected by an accumulator logic (32) of the interface circuit (3). This logic (32), which carries out the collection or accumulation of the responses with a barrier marker, comprises an accumulator register revstat (33), wherein each bit represents the generation of a specific requests.

Each response to its special requests sets one bit, among the 6 bits in the register revstat, in which the bits 0 through 4 indicate whether the response comes through the serial link $10_0$ through $10_3$ and the bits 5 through 6 indicate whether the response comes from the IOBX ($2_0$) or ($2_1$), thus determining the path followed by the requests and by the responses, respectively. Each response with a barrier marker received by the accumulator logic (32) of the interface circuit (3) causes the writing of a corresponding so-called "barrier" bit in the accumulator register (33). The microprocessor (11) that manages the integrated circuit (1) will read the accumulator register revstat (33) in order to verify that the responses with a barrier marker of all the specific requests have returned. The microprocessor (11) performs this reading of the accumulator register revstat (33) with a certain timeout. In this way, if the expected responses with a barrier marker are missing, the logic (3) will be able, in the next step (73), to locate the potential failures of the link. In effect, the control characters associated with the requests, and respectively with the responses, comprise information related to the transmission source and the paths followed by the requests, and respectively by the responses. In this way, the logic (32) for accumulating the responses can locate the failure or failures in the serial link by determining the paths for which the expected responses have not returned. The ineffective data of the responses with a barrier marker are ignored by the interface circuit (3).

Figure 7B:
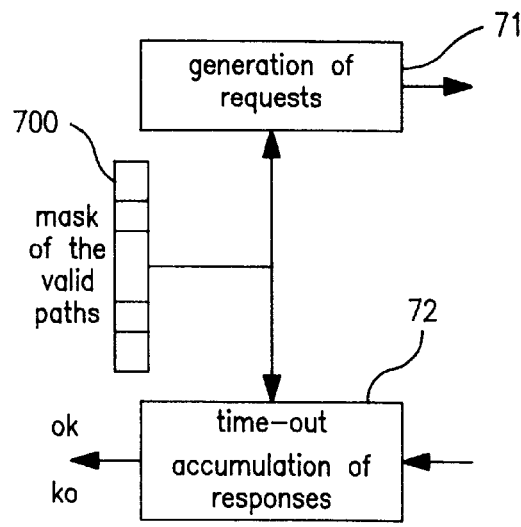
FIG. 7B represents a simplified logic diagram detailing some of the steps of the process illustrated in FIG. 7A, FIG. 8 schematically represents an interconnecting network to which the process for flushing serial links according to the invention has been applied.
Figure 7A:
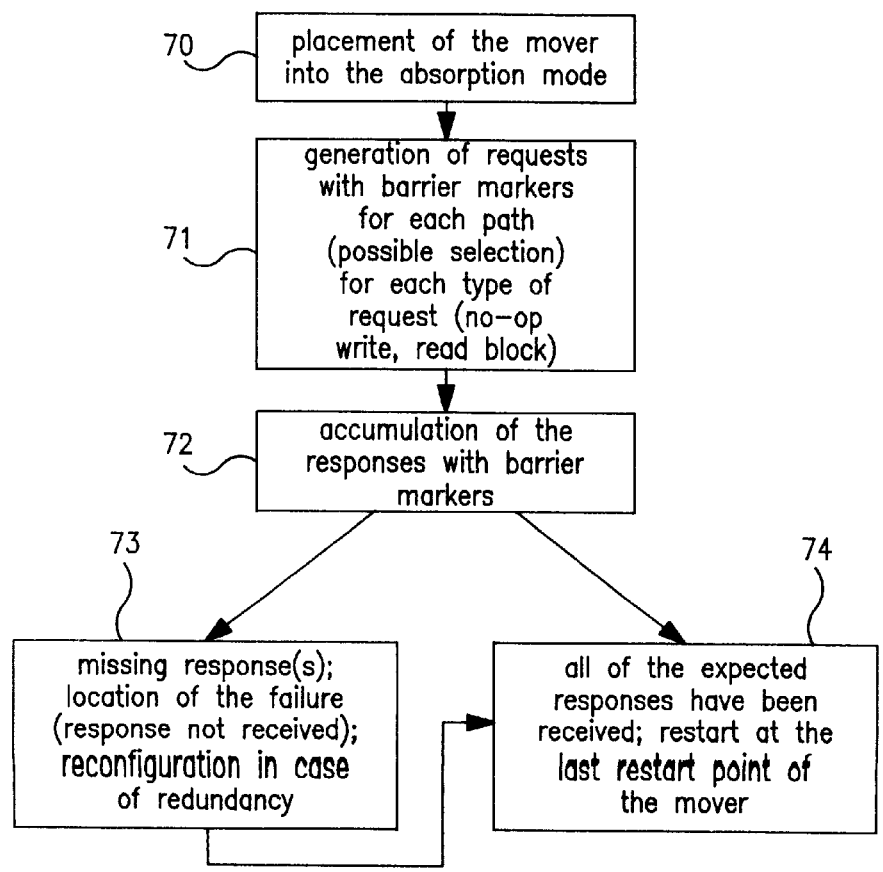
FIG. 7A represents a simplified logic diagram illustrating the steps of the process for flushing the serial link according to the invention.

FIG. 7B represents, in a more detailed way, the process for the determination of the valid paths of the link by the interface logic (3). A mask (700) of the valid paths is produced by comparing the processes for generating (72) requests and accumulating (72) the corresponding responses with a timeout. As indicated in the step (73), the location of potential failures makes it possible to reconfigure the link in a degraded mode, ignoring the malfunctioning channel or channels.

Figure 3C:
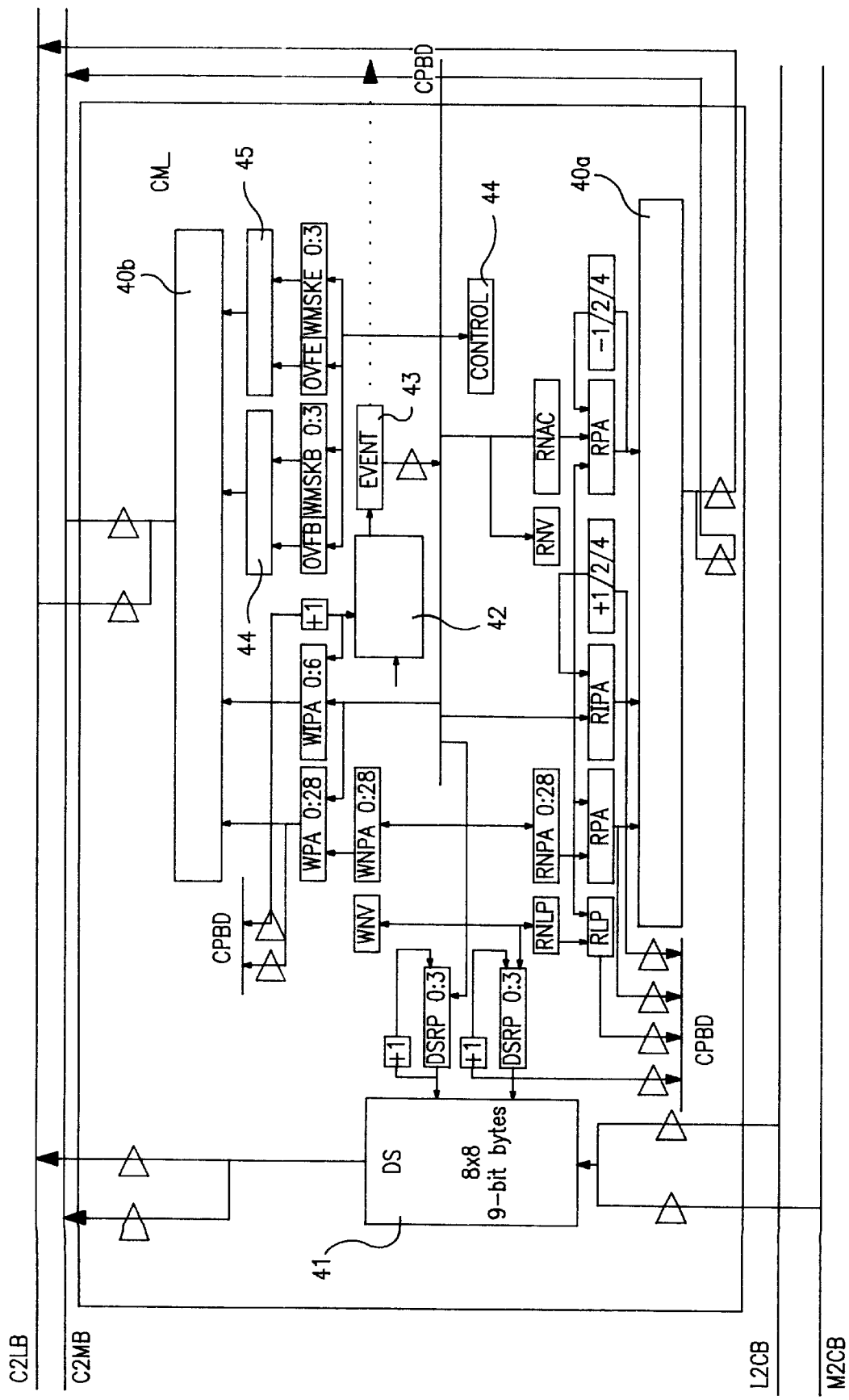
FIG. 3C represents the diagram of the part of the integrated circuit constituting the mover circuit.

In the case where all the expected responses with a barrier marker have been received, the microprocessor (11) recognizes in the step (74) that the cleaning or flushing of the serial link has been completed and the current application can then be restarted from the last restart point stored in the mover (4). For example, the last restart point of the mover (4) can be stored automatically at each reinitialization in a specific register of the interface logic (3), which register is read by the microprocessor (11). The microprocessor can then return the mover (4) to the "normal" mode of operation, in which it uses the channels that link it to a memory cyclically and with interleaving. The mover (4) executes data transfers in packets, for example of 4K bytes at maximum, and saves in the internal registers information on the data block in the process of being transferred and the next data block to be transferred. To do this, the mover (4) can restart the data transfer at the point where it was before any failure of the link occurred. For this purpose, the mover (4) will search, at each reinitialization, for this information characterizing the next data block to be transmitted. In the non-limiting exemplary embodiment described in connection with FIGS. 3B and 3C, the card EMA has, on the one hand, four channels or paths (c0, c1, c2, c3) incorporating the circuits SLC ($10_0$ through $10_3$), as represented schematically by FIG. 5, to the card EMC of the expanded memory EMU (12c), or remote memory, and on the other hand two paths (a0, a1) to the main memory MMU (12a), or local memory, incorporating the circuits IOBX ($2_0$ and $2_1$). In this case, the process for flushing all of the paths will require the generation of six specific read requests with a barrier marker and six specific write requests with a barrier marker. Thus, the corresponding accumulator register (revstat) of the accumulator logic (32) comprises 12 bits. In the example described, the steps of the process for flushing the serial link are implemented by a hardwired logic whose sequencing is ensured by a program executed by the microprocessor (11). of course, without departing from the spirit of the invention, the process for flushing the serial link could be implemented by a fully hardwired device.

It is understood that this results in a process and a device for flushing serial link buffers that can be easily implemented, for example following a failure of the link such as an electrical disturbance. This process for flushing the link can be implemented after the restart or reinitialization of the serial link and before the restart of the current application at the last restart point, without requiring a reinitialization of the entire system.

Figure 8:
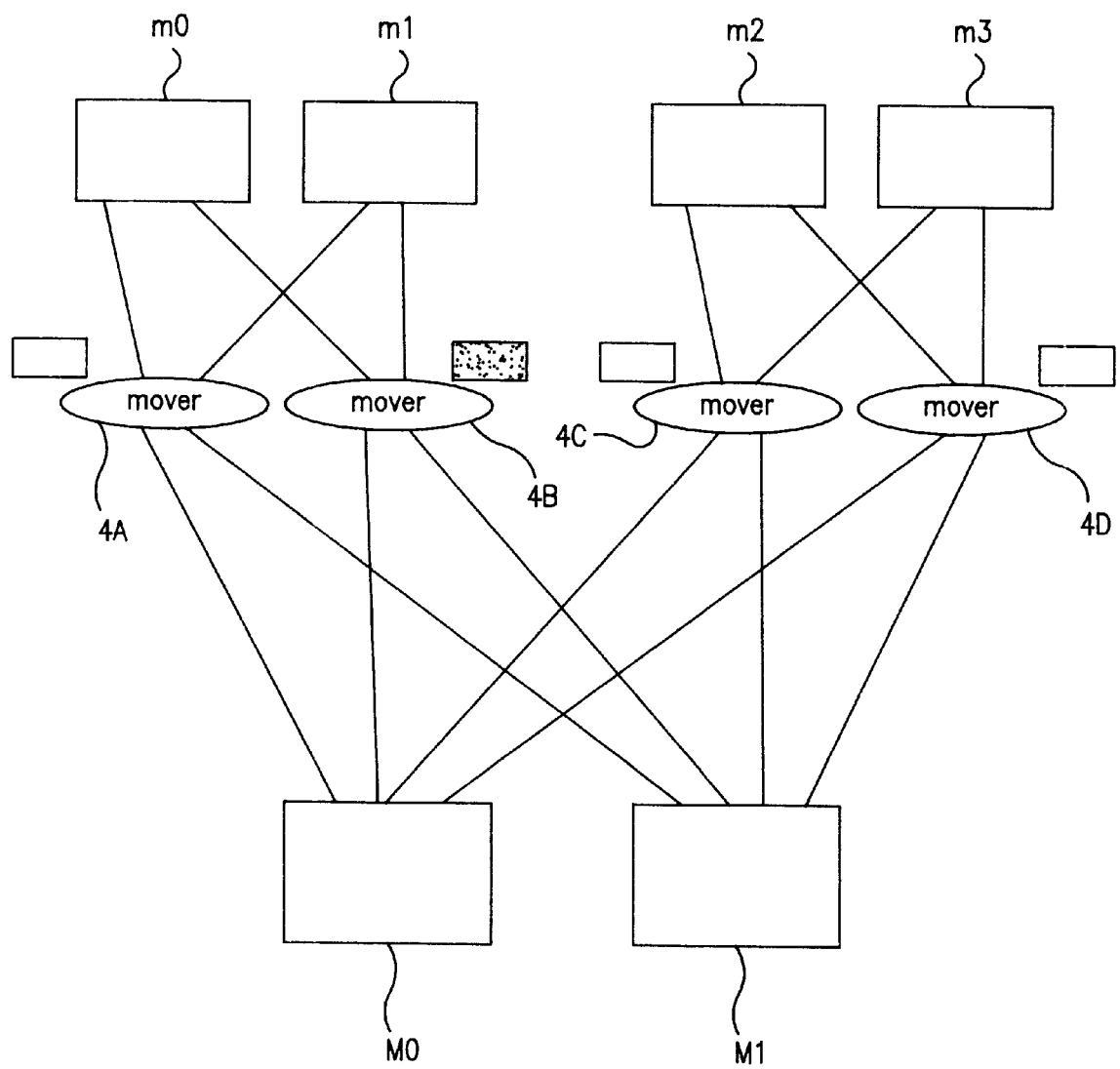

Of course, this flushing device can also be used for self-testing by scanning the subsystem of the network interconnecting the memories with a mover, such as for example the mover (4B) of the interconnecting network represented schematically in FIG. 8. The interconnecting network of FIG. 8 comprises four movers (4A, 4B, 4C and 4D). For example the four movers (4A, 4B, 4C and 4D) implement, in an interleaved way, the linking of four expanded memory areas (m0, m1, m2, m3) with two main memory areas (M0, M1). Two first (4A, 4B) movers are each connected to two first expanded memory areas (m0, m1) and to two main memory areas (M0, M1). The other two movers (4C, 4D) are each connected to two second expanded memory areas (m2, m3) and to the same two main memory areas (M0, M1). The process for generating specific requests in the four channels of the subsystem of the interconnecting network visible from a mover (4B), and the processing of the corresponding responses received, can make it possible to locate potential failures by means of the flushing device and thus to reconfigure the link in a degraded mode, ignoring the malfunctioning channel or channels detected.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for flushing high-speed buffers in a serial link including two-way communication channels used between a mover circuit (4) executing read and write data move operations and at least two memories (12a, 12c), the mover circuit being linked to each memory (12a, 12c) by at least two two-way channels (400, 401), the data move operations each being constituted by a move request followed by the return of a response or acknowledgement of the request, the mover circuit using the two two-way channels (400, 401) to cyclically link the mover circuit to a memory (12a, 12c) with interleaving, for the same operation, each channel (400, 401) being adapted to maintain the order in which the requests, and respectively the responses, of the same request stream and respectively the same response stream are sent, the responses following the same pair of channels (400, 401) as the responses for which they constitute the acknowledgements, characterized in that the process comprises the following steps:

placing the mover circuit (4) into an "absorption" mode of operation in which the responses are accepted independent of any order of arrival through the channels (400, 401) and are ignored by the mover circuit (4), generating a specific write request and a specific read request in at least some of the channels (400, 401) establishing a serial link, the specific requests having no effect on the memories (12a, 12c) and each request comprising a "barrier" marker contained in a control character preceding and/or following the specific request, the barrier marker also being contained in a control character associated with a response corresponding to each specific request, accumulating the received responses comprising a barrier marker, and comparing the received responses comprising a barrier marker with the specific requests generated, so as to either locate a potential failure in the case where the expected responses for a barrier marker are missing, or to recognize that flushing of the channels (400, 401) has been carried out in the case where all of the expected responses with a barrier marker have been received.

2. The process for flushing high-speed buffers in a serial link according to claim 1, characterized in that the step for comparing the received responses comprising a barrier marker with the specific requests generated comprises comparing the number of received responses with a barrier marker with the number of specific requests generated.

3. The process for flushing high-speed buffers in a serial link according to claim 1, characterized in that the control characters associated with the specific requests, and respectively with the responses to the specific requests, comprise information related to a transmission source and the channels (400, 401) followed by the specific requests, and respectively by the responses.

4. The process for flushing high-speed serial link buffers according to claim 3 characterized in that the step of comparing the received responses comprising a barrier marker with the specific requests generated comprises reading the information contained in the control characters of the responses with a barrier marker related to the transmission source and the channels (400, 401) followed for locating potential failures of the serial link.

5. The process for flushing high-speed buffers in a serial link according to claim 1, characterized in that the step for placing the mover circuit (4) into the absorption mode is carried out while the serial link is offline and further includes reestablishing the serial link after the placement of the mover circuit (4) into the absorption mode.

6. The process for flushing high-speed buffers in a serial link according to claim 1, characterized in that the specific write requests are constituted by partial write requests with a null mask so as not to modify the memories during flushing.

7. The process for flushing high-speed buffers in a serial link according to claim 1, characterized in that the mover circuit (4) executes data transfers in packets of a maximum of 4K bytes and stores in registers the information on a current data block being transferred and the next data block to be transferred, and further including the step of restarting the data transfer at a point where a failure occurred.

8. The process for flushing high-speed buffers in a serial link according to claim 1, further including returning the mover circuit to a normal mode of operation in which the mover circuit uses the channels (400, 401) that link it to a memory (12a, 12) cyclically, with interleaving when the step for comparing the received responses comprising a barrier marker with the specific requests generated ends with the recognition that flushing of all of the channels (400, 401) has been carried out.

9. The process for flushing high-speed buffers in a serial link according to claim 1, characterized in that flushing follows a failure of a serial link due to an electrical disturbance, after the restart or reinitialization of the serial link and before the restart of a current application at the last restart point, without reinitializing the entire system.

10. The process for flushing high-speed buffers in a serial link according to claim 1, comprises scanning a subassembly of a network interconnecting the memories to the mover circuit (4) to perform a self-test for the location of potential failures so as to make it possible to reconfigure the serial link in a degraded mode while ignoring the malfunctioning channels (400, 401).

11. The process for flushing high-speed buffers in a serial link according to claim 1, characterized in that each two-way channel (400, 401), is constituted by two one-way cables (1400A, 1400B) in which the data travel in opposite directions.

12. A circuit for flushing high-speed buffers in a serial link including two-way communication channels comprising a mover circuit (4) for executing read and write data move operations, between at least two memories (12a, 12c), the mover circuit being linked to each memory by at least two two-way channels (400, 401), the data move operations each being constituted by a move request followed by the return of an acknowledgement response to the request, the mover circuit cyclically linking the two-way channels (400, 401) to a memory with interleaving, for the same operation, each channel maintaining the order in which the requests, and respectively the responses, of the same request and respectively the same response are sent, the responses following the same channel (400, 401) as the requests for which they constitute the acknowledgements, characterized in that the system comprises:

means for placing the mover circuit (4) into an absorption mode of operation in which the responses are accepted independent of any order of arrival through the channels (400, 401) and are ignored by the mover circuit (4), means for generating a specific write request and a specific read request in each of the channels of the serial link, the specific requests having no effect on the memories, means for generating within these requests a barrier marker contained in a control character preceding and/or following the request, and means for generating a barrier marker in a control character associated with the response corresponding to each specific request, means for accumulating the received responses comprising a barrier marker, and means for comparing the received responses comprising a barrier marker with the specific requests generated, making it possible either to locate a potential failure in the case where the expected responses comprising a barrier marker are missing, or to recognize that the flushing of all of the channels has been carried out in the case where all the expected responses comprising a barrier marker have been received.

13. The circuit for flushing high-speed buffers in a serial link according to claim 12, characterized in that it further comprises means (11) for comparing the number of received responses with a barrier marker with the number of specific requests generated.

14. The circuit for flushing high-speed buffers in a serial link according to claim 12, comprising means for generating information related to a further transmission source and paths followed by the requests, and respectively by the responses, in the control characters associated with the requests, and respectively with the responses, and means for reading the information contained in the control characters of the responses with a barrier marker related to the transmission source and the paths followed, for locating potential failures of the serial link.

15. The circuit for flushing high-speed buffers in a serial link according to claim 13, comprising means for generating information related to a further transmission source and paths followed by the requests, and respectively by the responses, in the control characters associated with the requests, and respectively with the responses, and means for reading the information contained in the control characters of the responses with a barrier marker related to the transmission source and the paths followed, for locating potential failures of the serial link.

16. The circuit for flushing high-speed buffers in a serial link according to claim 14, further comprising data processing means (11) for reinitialization of the serial link followed by the placement of the mover circuit (4) into the so-called "absorption" mode.

17. The circuit for flushing high-speed buffers in a serial link according to claim 15, further comprising data processing means (11) for reinitialization of the serial link followed by the placement of the mover circuit (4) into the so-called "absorption" mode.

18. The circuit for flushing high-speed buffers in a serial link according to claim 16, characterized in that the data processing means (11) include means for the generation of specific read and write requests, and means for receiving the responses with a barrier marker to the specific requests.

19. The circuit for flushing high-speed buffers in a serial link according to claim 18, characterized in that the data processing means (11) comprise at least one accumulator register wherein each bit represents the generation of a specific request, each response with a barrier marker received by the processing means (11) causing the writing of a barrier bit in the accumulator register for comparison of the number of received responses with a barrier marker with the number of specific requests generated.

20. The circuit for flushing high-speed buffers in a serial link according to claim 19, characterized in that the data processing means (11) comprise timeout means for generating a failure detection message when an expected response with a barrier marker is missing after a predetermined time lapse.

* * * * *